(12) United States Patent
do Amaral Assy

(10) Patent No.: US 10,375,875 B2
(45) Date of Patent: Aug. 13, 2019

(54) AGRICULTURAL SOWING IMPLEMENTS AND SEED METERS

(71) Applicant: Jose Roberto do Amaral Assy, Caldas Novas (BR)

(72) Inventor: Jose Roberto do Amaral Assy, Caldas Novas (BR)

(73) Assignee: Jose Roberto do Amaral Assy, Caldas Novas (BR)

( * ) Notice: Subject to any disclaimer, the term of this patent is extended or adjusted under 35 U.S.C. 154(b) by 16 days.

(21) Appl. No.: 15/517,692

(22) PCT Filed: Oct. 9, 2015

(86) PCT No.: PCT/BR2015/050178
§ 371 (c)(1),
(2) Date: Apr. 7, 2017

(87) PCT Pub. No.: WO2016/054715
PCT Pub. Date: Apr. 14, 2016

(65) Prior Publication Data
US 2017/0295716 A1    Oct. 19, 2017

(30) Foreign Application Priority Data
Oct. 10, 2014    (BR) ............................ 102014025337

(51) Int. Cl.
*A01C 7/04*        (2006.01)
*A01C 5/06*        (2006.01)
(Continued)

(52) U.S. Cl.
CPC ................ *A01C 7/04* (2013.01); *A01C 5/064* (2013.01); *A01C 7/163* (2013.01); *A01C 7/203* (2013.01); *A01C 7/206* (2013.01)

(58) Field of Classification Search
CPC .. A01C 7/04; A01C 7/00; A01C 5/064; A01C 5/062; A01C 5/06; A01C 5/00;
(Continued)

(56) References Cited

U.S. PATENT DOCUMENTS 4,009,668 A    3/1977  Brass et al.
4,594,951 A    6/1986  Grataloup
(Continued)

FOREIGN PATENT DOCUMENTS

BR    IP0104497 A    5/2002
BR    PI0904828 A2   5/2013
WO    2016054715 A1  4/2016

OTHER PUBLICATIONS

U.S. Appl. No. 15/285,933, filed Oct. 5, 2016, Assy José Roberto Do Amaral.
(Continued)

*Primary Examiner* — Christopher J. Novosad
(74) *Attorney, Agent, or Firm* — FisherBroyles, LLP

(57) ABSTRACT

An agricultural sowing implement that, when moved by a drive unit, distributes seeds in the ground with regular, uniform spacing. The agricultural sowing implement comprises a rocker system placed behind the chassis of the implement where a seed dispenser is positioned. The rocker system may include a beam connected to two depth-limiting wheels on the ends of the beam. In one embodiment of the disclosure, provision is made for two interlinked smaller wheels connected to a central lower extension of the beam, the set of wheels being encircled by a rolling band. In addition, provision is made for two dampers, one for each of the depth-limiting wheels.

6 Claims, 10 Drawing Sheets

(51) Int. Cl.
*A01C 7/16* (2006.01)
*A01C 7/20* (2006.01)

(58) Field of Classification Search
CPC .. A01C 7/163; A01C 7/16; A01C 7/08; A01C 7/203; A01C 7/201; A01C 7/206
See application file for complete search history.

(56) References Cited

U.S. PATENT DOCUMENTS

2013/0020099 A1* 1/2013 Renyer ............... A01O 5/064
172/1
2016/0044859 A1 2/2016 Do Amaral Assy

OTHER PUBLICATIONS

U.S. Appl. No. 15/311,634, filed Nov. 16, 2016, Assy José Roberto Do Amaral.
U.S. Appl. No. 15/354,717, filed Nov. 17, 2016, Assy José Roberto Do Amaral.

* cited by examiner

AGRICULTURAL SOWING IMPLEMENTS AND SEED METERS

CROSS-REFERENCE TO RELATED APPLICATIONS

This application is a national phase entry under 35 U.S.C. § 371 of International Patent Application PCT/BR2015/050178, filed Oct. 9, 2015, designating the United States of America and published as International Patent Publication WO 2016/054715 A1 on Apr. 14, 2016, which claims the benefit under Article 8 of the Patent Cooperation Treaty to Brazilian Patent Application Serial No. BR 10 2014 025337 8, filed Oct. 10, 2014.

TECHNICAL FIELD

This disclosure concerns an agricultural sowing implement that, when moved by a motor unit, distributes seeds in the soil at regular and uniform spacing. Using a rocker system promotes a structural arrangement that equalizes the vertical movement of the agricultural implement during sowing, which reduces its vibrations and oscillations transmitted by soil irregularities.

Additionally, the implement covers new positioning for the seed meter, so that the curve that the seed makes after exiting the meter coincides with the curve of the seed conductor leading to the soil.

Furthermore, one of the disclosure's modalities provides a seed meter with positioning bristles, which provide greater seed stability in the dosing disk.

These innovations considerably improve seed distribution quality in the planting groove and, as a consequence, the crop productivity.

BACKGROUND

As understood by those skilled in these techniques, good seed distribution in planting grooves is quite beneficial, since there is a direct correlation between seed distribution and the productivity of normally planted crops.

One of the factors that directly influences the distribution of seeds in the planting grooves are the oscillations and shaking that the agricultural sowing implements, known as planters, go through when moving through irregular plantation lands, since shaking of the planters affects the seed meter, which, in turn, affects the seeds, negatively influencing their distribution in the planting grooves formed by the depth-limiting wheel.

These plantation land irregularities were especially observed in planting systems denominated "direct planting" or "direct planting in straw," in which the soil is not plowed or tilled, and seeds are simply planted on the remains of the previous crop. Therefore, soil surface irregularities, or micro relief irregularities, are especially high in relation to the traditional cultivation system, in which plows are used to make the soil precisely uniform. In direct planting, there are many traces left by various machines: tractors, planters, harvesters, sprayers among others, which end up provoking and accentuating these ground irregularities.

Soil micro-relief irregularities, especially those that cause vertical shaking of the depth-limiting wheels, significantly affect the frequency and quality of seed deposits in the soil. Shaking, or vertical acceleration occurring in a short period of time of the depth-limiting wheel, also cause the same effect in the meter and the seed conductor, since the connection between these planter items is direct; implements equipped with a component to cushion these impacts do not exist in the prior art inventions.

With regard to seed meters, the various known prior art types, including horizontal disks, pneumatic meters and digital meters, among others, which have the function of releasing the seeds in the seed conductor, are positioned so that the meter center coincides with the longitudinal axis of the seed line, as shown in FIG. 4. This meter positioning causes seeds to be dropped at a right angle from the movement direction of the agricultural implement, as shown in FIG. 5, generating a mismatch between the seed drop curve and the seed conductor curve, which leads to the ground. As the seed conductor is slightly bent backward, in order to send seeds backward in the conductor, seeds also drop at right angles from the conductor curve, which causes them to fall into the conductor with a left-leaning curve, generating a shock of the seeds against the conductor walls, as shown in FIG. 6. This mismatch of curves causes seeds to ricochet with conductor walls, which causes the seeds to reach the ground at irregular intervals, damaging uniform distribution thereof in the planting furrow.

Among the various prior art agricultural seeding equipment models, patent document PI1000054-2 describes a seed delivery system for use in a seeding or planting machine that removes the seed from the seed meter, so capturing the seed. The distribution system then sends the seed down to a lower discharge point and accelerates the seed horizontally backward at a velocity approximately equal to the forward travel speed of the seed machine, so that the seed, when discharged, has a low or no horizontal velocity relative to the ground. Therefore, the bearing of the seed in the pit is reduced. Furthermore, since seeds only have a short drop from the outlet to the bottom of the seed pit, seeds have little vertical velocity in order to induce ricochet. The distribution system uses a brush strap to capture, move and accelerate seeds. By capturing seeds and moving them from the meter to be discharged, seeds are held in place relative to other seeds and relative to the planter's row unit. As a result, seeds are isolated from the dynamics of the row unit, therefore maintaining seed spacing.

The sowing machine described in the document above, while reducing the variation in seed spacing a little, does not produce an overall satisfactory result, since the intensity of shaking transmitted to the machine due to soil micro relief irregularities is transferred to the meter, and to the seeds as a consequence, impairing the distribution thereof at regular intervals and spacing in the planting grooves.

Another prior art document is BR1020140117946, which describes a precision seed dosing system applied to a planter with a soil-touching element and a chassis that supports a seed meter. According to the patent, the system in question comprises at least one damping system between the machine soil-touching element and the seed meter.

The drawback of the system described in the document above, though it has advantages over the prior art, is the fact that the damper system is not able to absorb and compensate for the shaking originating from the soil micro relief oscillations, which have a negative influence on the seed distribution in the planting grooves.

Another prior art document is BR 1020120028387, which describes a seed selector and conductor system for a seed meter device employed in agricultural seeding equipment, consisting of seed organizers, an anti-hop bulkhead and at least one set of toothed disks, suitably arranged in the seed dosing device, which, in turn, is made up of a base, a counter base, a cradle and a neck.

The disadvantage presented for the technique described in the document cited above is the fact that seeds fall into the seed conductor in a curve tending to the left relative to the seed conductor's vertical axis, causing the seeds to impact the conductor walls and causing the failure of the seeds to reach the ground in the same longitudinal direction in the planting groove. Furthermore, another drawback is the fact that the seeds have little stability when they are moving in the seed meter disk, which also affects their distribution in the soil.

The operation of a seed distribution system as described in BR1020140117946 and BR 1020120028387 has resulted in the development of this patent, which provides an agricultural sowing implement provided with a structural arrangement that equalizes the planter's vertical movement during sowing, reduces its vibrations and oscillations due to soil irregularities, and provides uniform distribution of the seeds in the planting grooves.

Therefore, it is a prior art need to provide an agricultural sowing implement that has a structural arrangement that results in improved product performance, providing uniform seed distribution in the planting grooves at regular intervals and spacing.

BRIEF SUMMARY

Some embodiments of the disclosure relate to providing an agricultural sowing implement that has a new structural arrangement that provides distribution of the seeds in the planting grooves at regular and uniform intervals and spacing, improving crop productivity.

Some embodiments of the disclosure include an agricultural sowing implement that reduces machine vibrations in relation to oscillations from soil irregularities, eliminating delays or advances for seeds being dropped into the soil.

Some embodiments of the disclosure include causing seeds to exit the seed meter by making a backward curve, coinciding with the seed conductor's curve, in order to avoid and/or minimize the seed shock against the seed conductor wall, so that seeds fall on the soil in the same longitudinal line, therefore improving the quality of seed distribution in the planting grooves.

Some embodiments of this disclosure include a seed meter that has a seed-stabilizing device for the seed meter disk.

DETAILED DESCRIPTION

Figure 1:
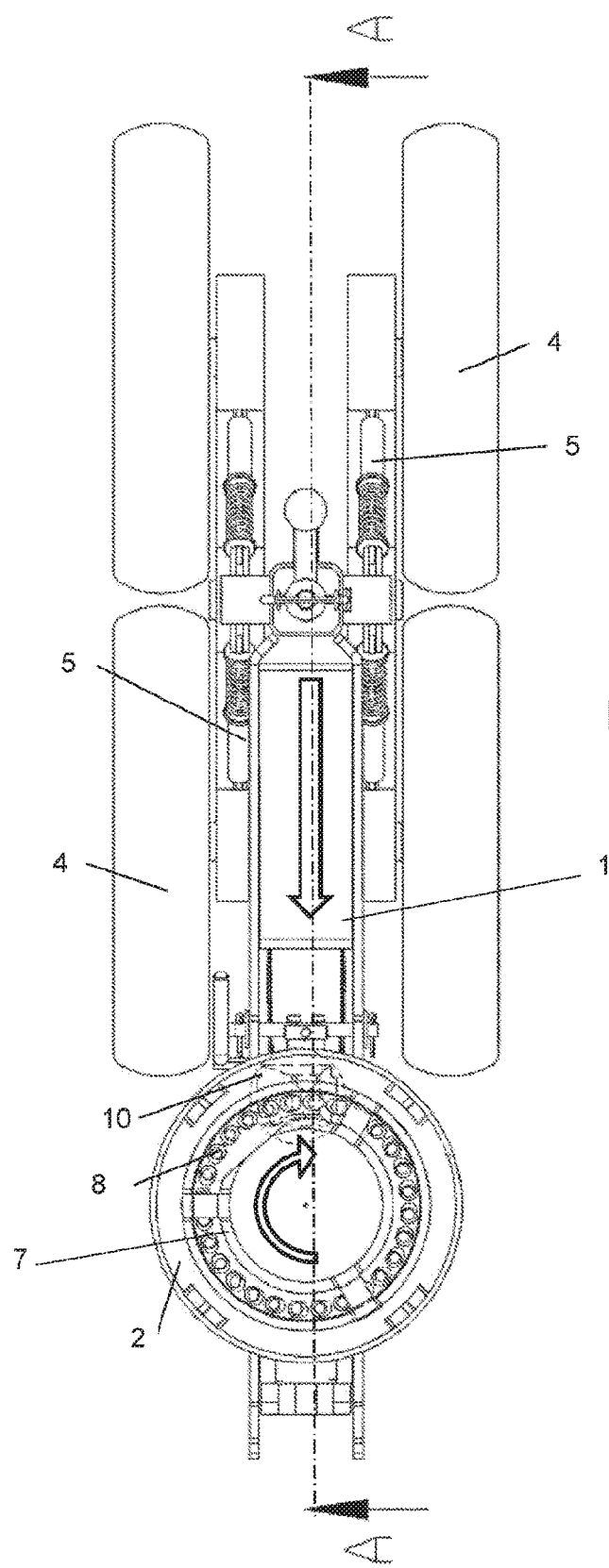
FIG. 1 is an upper view illustrating the agricultural sowing implement with the rocker in one embodiment of this disclosure.
Figure 2:
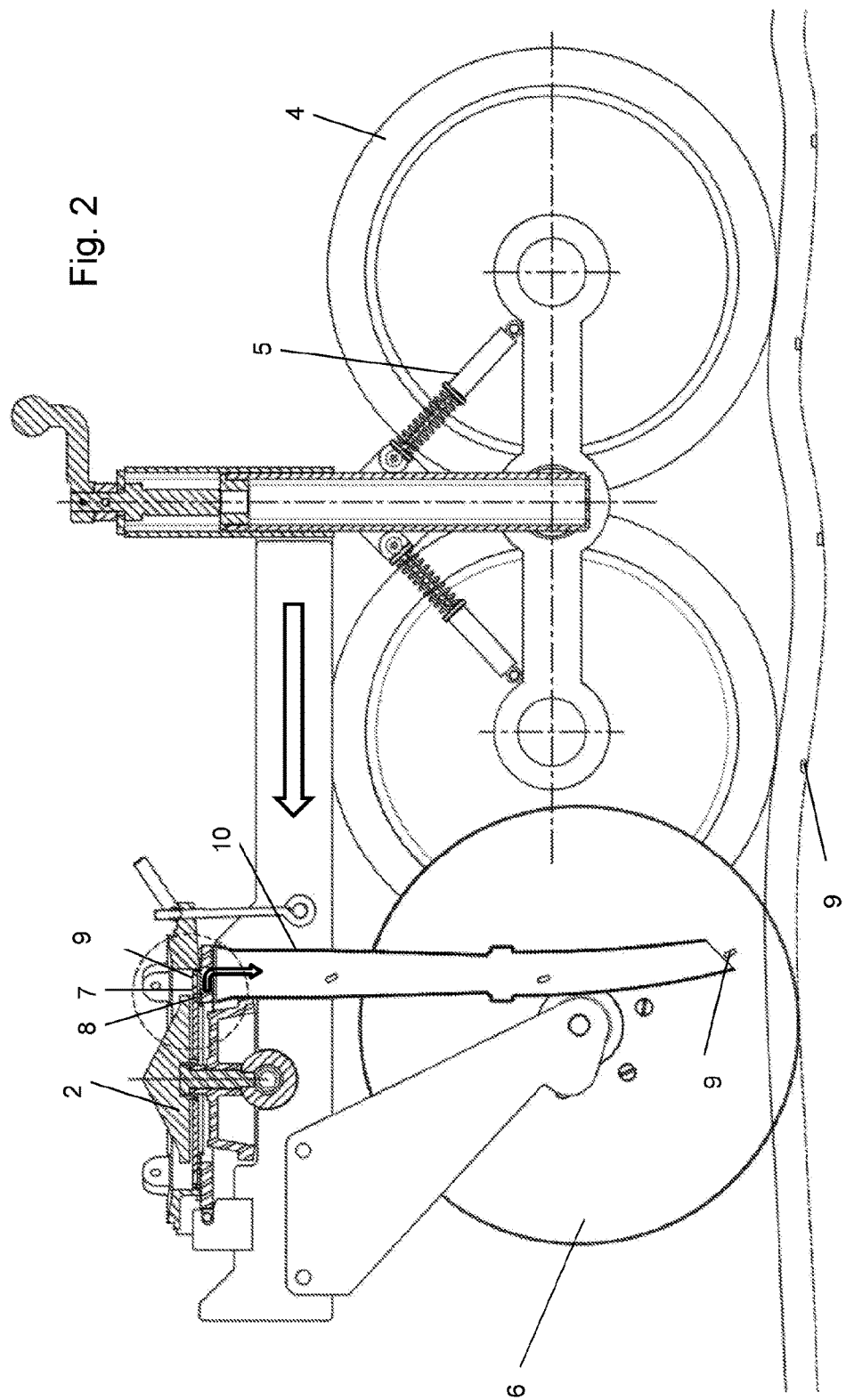
FIG. 2 is a side view of the agricultural sowing implement of the embodiment shown in FIG. 1 in a planting line.
Figure 3:
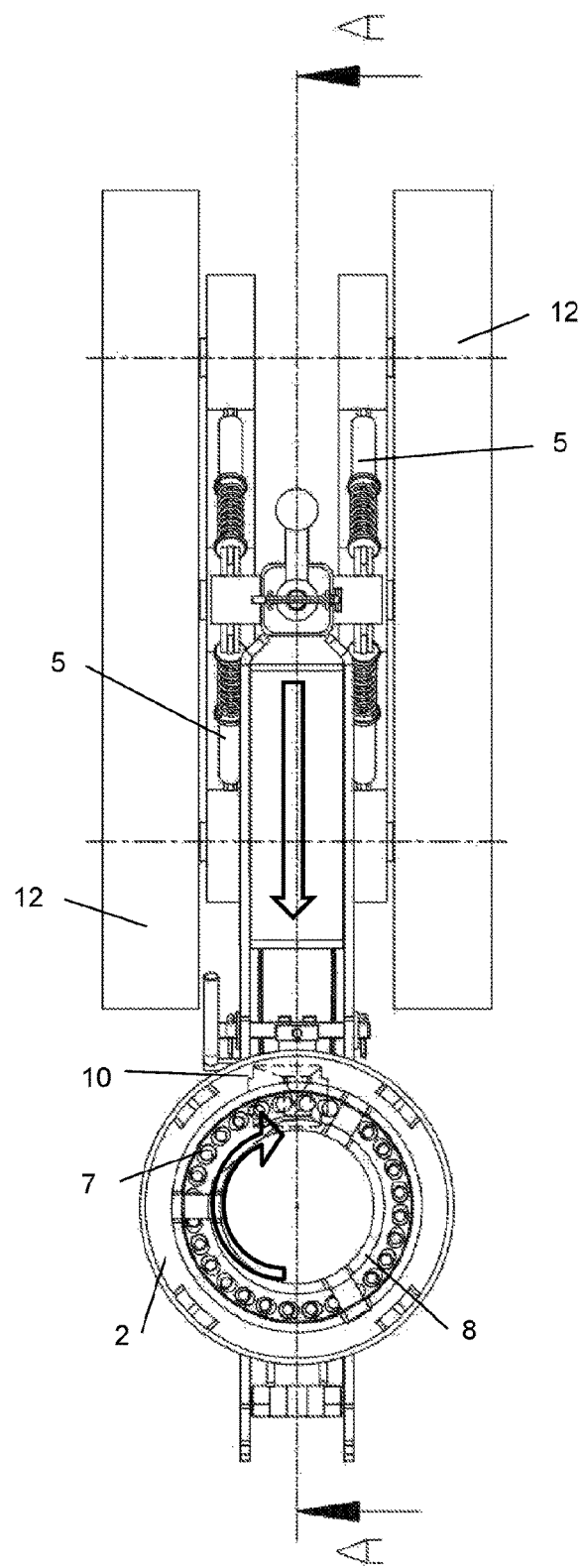
FIG. 3 is an upper view illustrating a modality of the agricultural sowing implement with a rolling band system in one embodiment of this disclosure.

As shown in the attached figures, the AGRICULTURAL SOWING IMPLEMENT is moved by a motor unit, and as shown in FIG. 1, it is made up of a rocker system placed behind the implement chassis (1) where a seed meter (2) is placed, the rocker system comprising a beam (3) connected to two depth-limiting wheels (4) at the ends, each wheel being connected to a damper (5). The agricultural implement also covers a cutting disk (6) connected to the chassis (1), the seed meter (2) comprising a disk (7) that has a plurality of orifices and a ring (8) provided with an opening through which the seeds (9) exit the meter and are dropped into a seed conductor (10).

Figure 4:
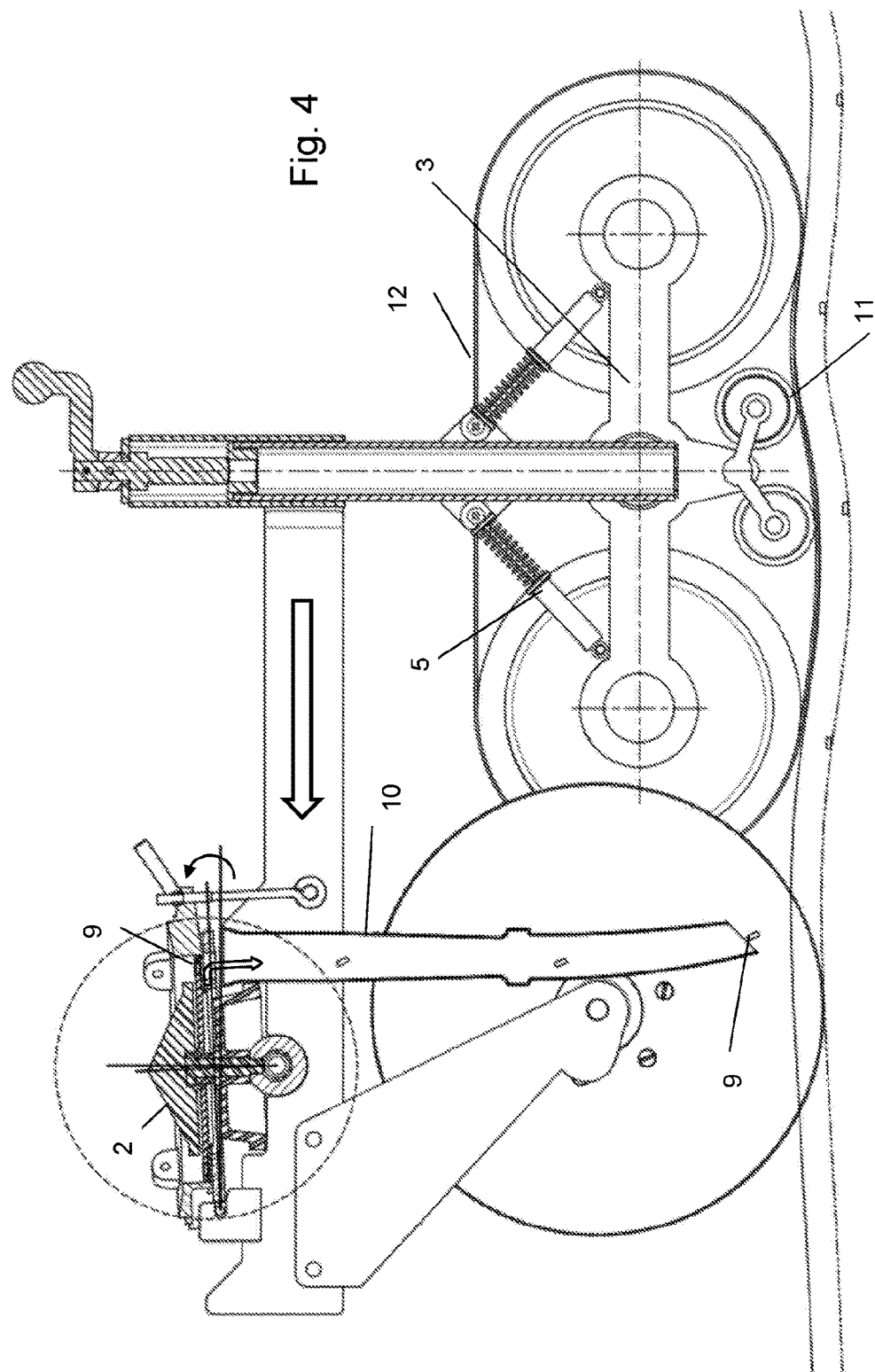
FIG. 4 is a side view of the agricultural sowing implement of the embodiment shown in FIG. 3 in a planting line.

In one modality of the disclosure, the rocker system is comprised of two smaller interconnected wheels (11) that are connected to a central lower extension of the beam (3), and the wheel set (4, 11) is surrounded by a rolling band (12), as shown in FIG. 4.

The structural arrangement of the rocker system of this disclosure causes the shaking of the depth-limiting wheels (4) caused by soil irregularities being absorbed, equalizing the vertical movement of the agricultural implement during sowing, reducing its vibrations and oscillations. In this way, the seeds (9) are not de-stabilized during their trajectory to the soil, exiting the seed meter (2) and passing through the seed conductor (10). The arrow in FIG. 1 on the chassis (1) indicates the machine's direction of movement, that is, the direction of planting, and the other arrow indicates the direction of seed meter (2) rotation.

Figure 5:
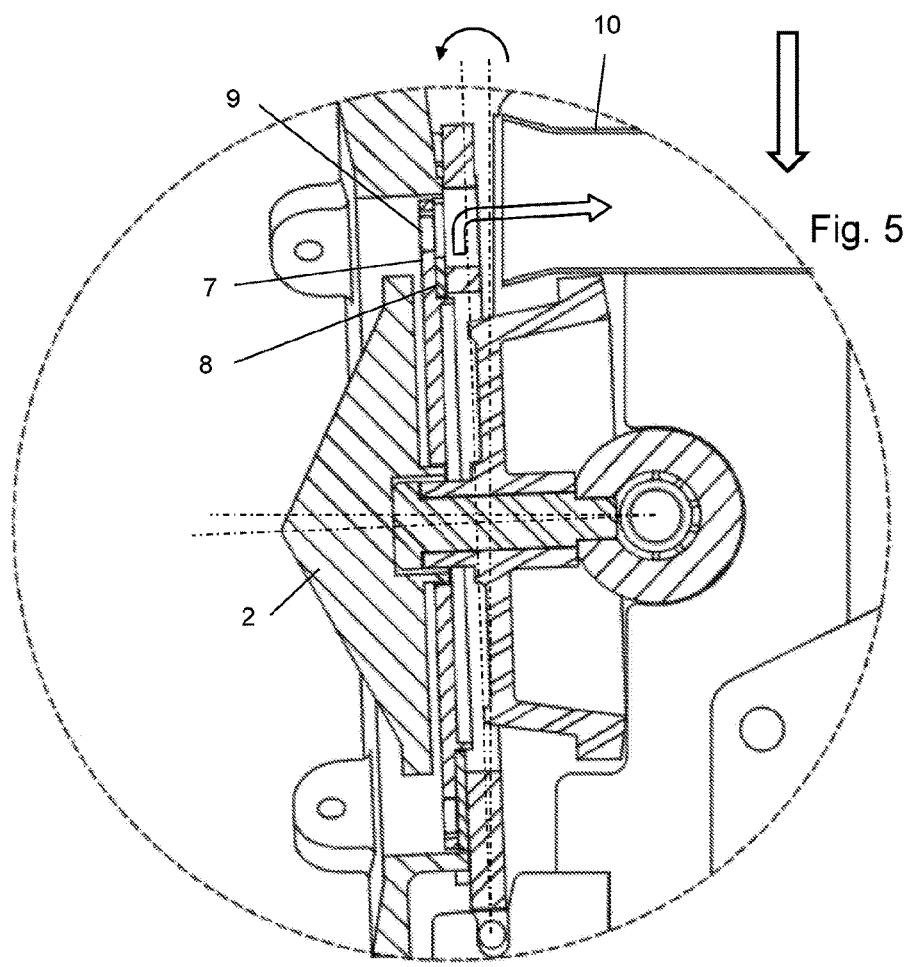
FIGS. 5 and 6 are detailed upper views of the seed meter of the agricultural sowing implement, illustrating the dropping of seeds into the seed conductor nozzle.
Figure 6:
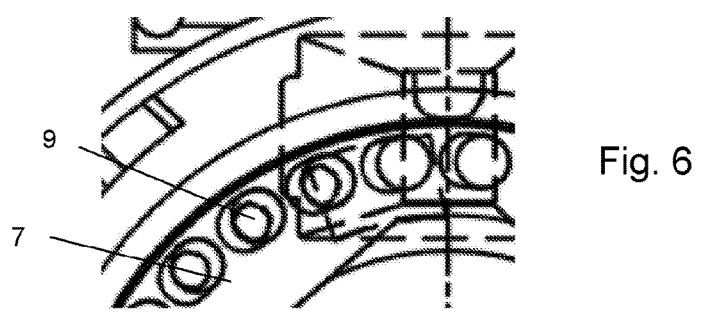

FIGS. 5 and 6 illustrate in detail the moment at which the seed leaves the seed meter (2) and is dropped into the seed conductor (10).

Figure 7:
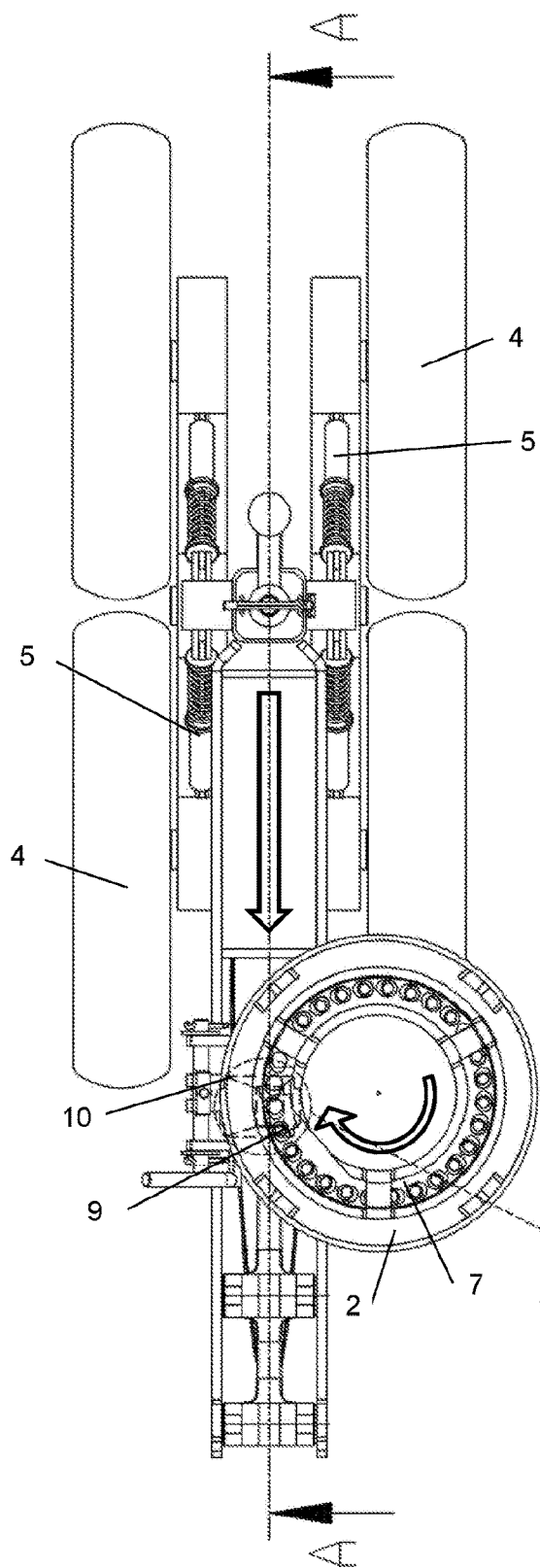
FIG. 7 is an upper view illustrating a modality of the agricultural sowing implement with a seed meter in a new position in one embodiment of this disclosure.
Figure 8:
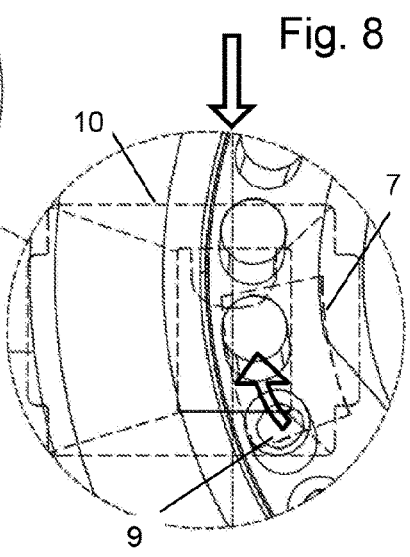
FIG. 8 is an upper view illustrating the seed's exit from the seed meter of the embodiment shown in FIG. 7 of this disclosure.
Figure 9:
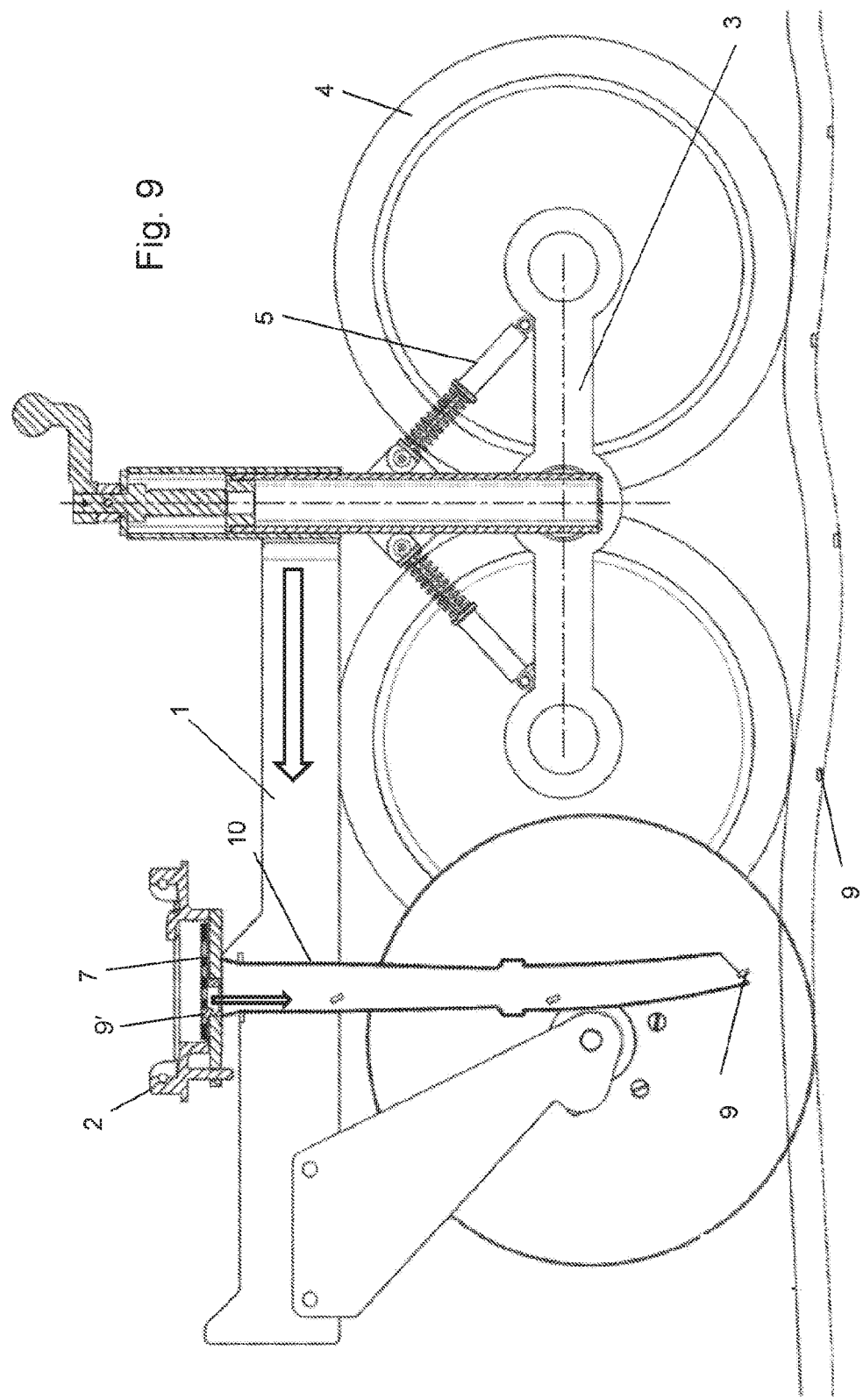
FIG. 9 is a side view of the agricultural sowing implement of the embodiment shown in FIG. 7 in a planting line.
Figure 10:
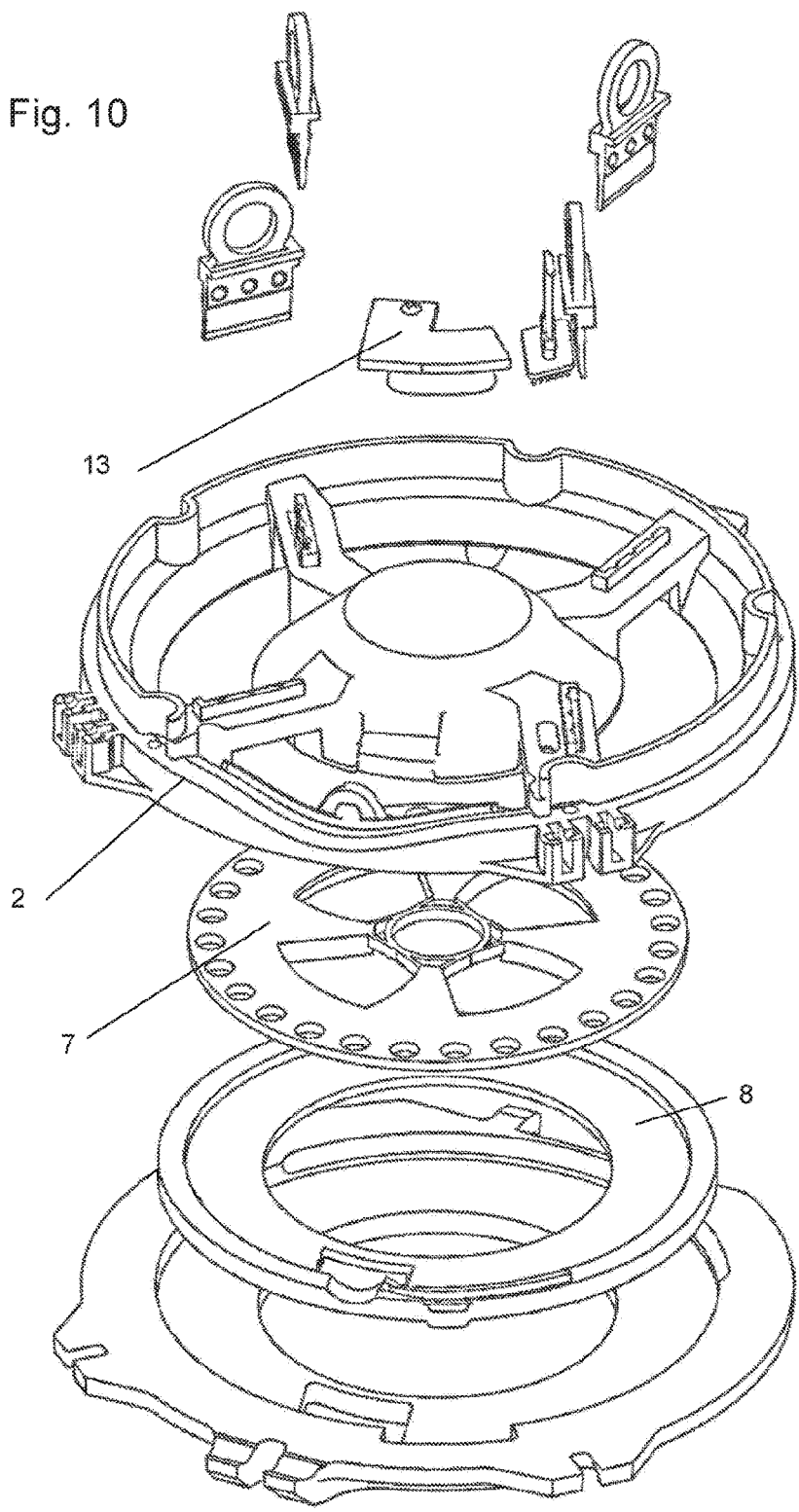
FIG. 10 is an exploded view of the seed meter of the embodiment shown in FIG. 7 of this disclosure.
Figure 11:
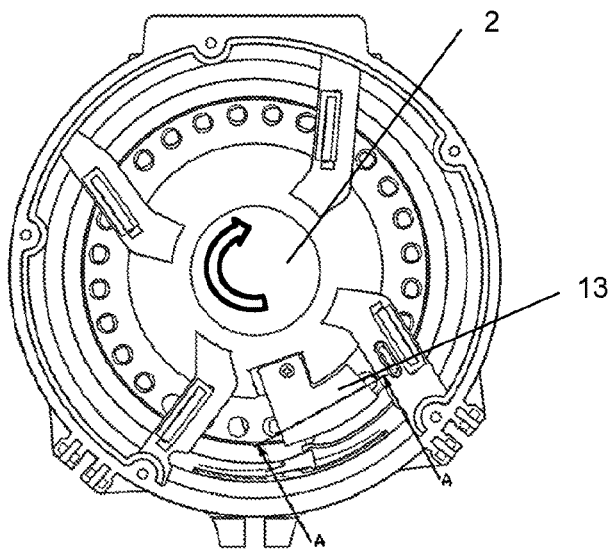
FIG. 11 is an upper view of the seed meter of the embodiment shown in FIG. 10 of this disclosure.

In one embodiment of the disclosure, as shown in FIGS. 7 and 8, the seed meter (2) is placed out of alignment with respect to the longitudinal axis of the agricultural implement's chassis (1). In this way, the center of the seed meter (2) is out of alignment relative to the longitudinal axis of the seed line, and the seed drop point (9') is aligned with the longitudinal axis of the seed line. Therefore, the direction of the curve that the seed (9) makes when leaving the meter (2) to reach the ground coincides with the direction of the planter, but in opposite directions, and the direction of the curve that the seed (9) makes when leaving the meter (2) to the ground coincides with the direction of the curve of the seed conductor (10). As can be seen in FIG. 9, the coincidence between the curve that the seed makes after leaving the meter (2) and the curve of the seed conductor (10), causes a dropping of seeds with a backward curve, forming the seed path to the conductor's shape, which also bends back, significantly reducing the probability of a seed conductor shock, which greatly improves the seed distribution quality in the planting groove.

Figure 12:
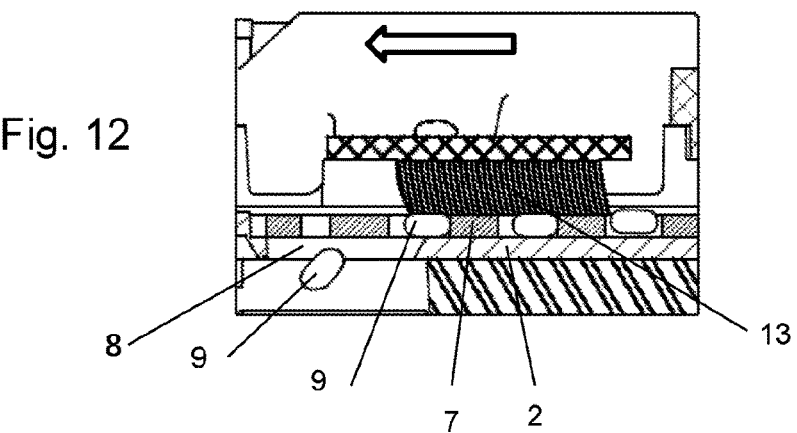
FIG. 12 is a side view of the modality of the seed meter of the embodiment shown in FIG. 10 of this disclosure.
Figure 13:
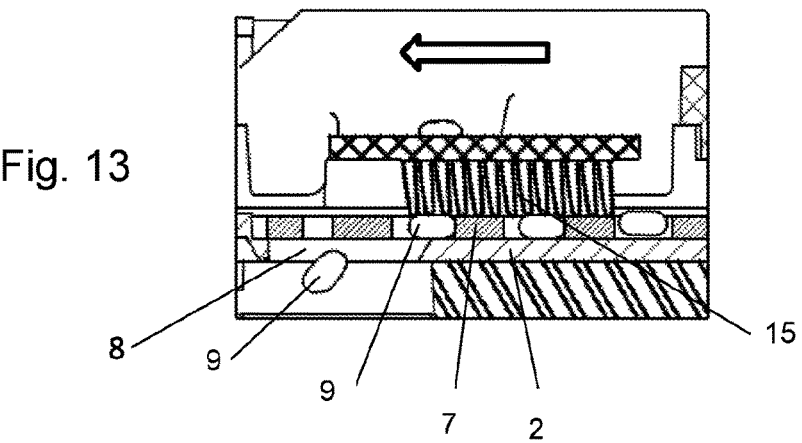
FIG. 13 is a detailed side view of another modality of the seed meter of the embodiment shown in FIG. 10 of this disclosure.
Figure 14:
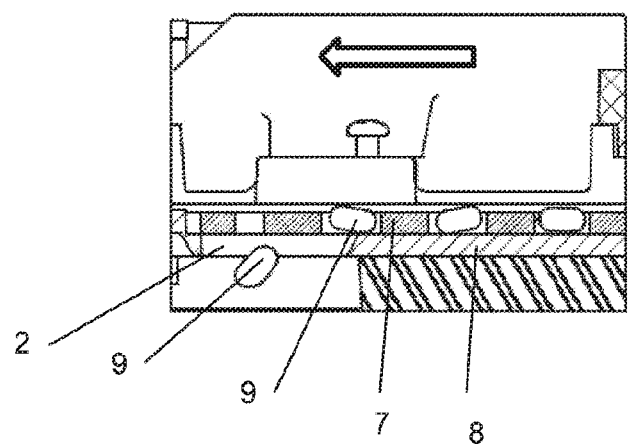
FIG. 14 is a detailed side view of a prior art seed meter.

In another modality of the disclosure, the seed meter (2) is comprised of a positioning device (13) placed adjacent the seed drop point (9') of the ring (8), above the disk (7), with bristles (14) or pins (15) being provided at the bottom of the device (13). As shown in FIGS. 12 and 13, the positioning device (13) has the purpose of promoting a slight top-down pressure on the seeds (9) in order to keep them pressed against the back of the orifices of the disk (7), rotating them until they exit the meter (2), promoting seed stability in the moving disk. In this way, the seeds (9) exit the meter (2) more regularly, falling evenly into the conductor (10), and consequently onto the ground.

The rocker system of this disclosure minimizes the agricultural implement's vertical vibrations that come from soil irregularities, which are transmitted to the seed meter, providing better distribution of the seeds in the planting grooves.

The new positioning of the seed meter of the disclosure provides a better outlet and dropping of seeds into the conductor, therefore easing seed ricochet against the conductor wall.

The seed meter positioning device of this disclosure, on the other hand, provides improved seed stability on the rotating disk, which also contributes to improve the seed distribution in the conductor.

These properties, introduced by the disclosure, cause the frequency and quality of seed deposits in the soil to be uniform at regular intervals and at a constant rate, increasing crop productivity.

In addition to that which is illustrated and described, other embodiments and applications of this disclosure may be disclosed and completed in a variety of constructive ways in order to idealize the scope of the disclosure and for it to function within the stated objectives, since, in practice, the disclosure provides a significant improvement in seed utilization and crop yield, due to improved seed distribution in the soil.

It should be readily understood by those skilled in the art that modifications of the disclosure may be made without departing from the concepts set forth in the previous description. Such modifications are considered as included within the scope of the invention. Accordingly, the particular conclusions previously described are merely illustrative and not limiting with respect to the disclosure's scope, to which the full extent of the attached claims and any equivalents thereof must be given.

The invention claimed is:

1. An agricultural sowing implement, comprising:
   a chassis;
   a cutting disk connected to the chassis and configured to form planting grooves in the soil for distributing seeds in the soil;
   a seed meter supported by the chassis;
   a seed conductor for conducting seeds to the planting grooves in the soil; and
   a rocker system associated with the chassis, wherein the rocker system comprises two depth-limiting wheels at ends of the rocker system, the depth-limiting wheels being surrounded by a rolling band.

2. The agricultural sowing implement of claim 1, wherein the rocker system further comprises two smaller wheels interconnected and arranged between the two depth-limiting wheels.

3. The agricultural sowing implement of claim 2, wherein the rocker system further comprises a beam connecting the depth-limiting wheels to each other.

4. The agricultural sowing implement of claim 3, wherein the two smaller wheels are connected to each other with a link that is connected to and rotatable relative to the beam.

5. The agricultural sowing implement of claim 1, wherein the seed meter is placed out of alignment in relation to a longitudinal axis of the chassis of the agricultural sowing implement.

6. The agricultural sowing implement of claim 1, wherein the seed conductor is curved, and wherein the seed conductor is configured such that seeds entering the seed conductor, after exiting the meter, travel through the curve of the seed conductor.

* * * * *